US012220828B2

(12) United States Patent
Lee et al.

(10) Patent No.: US 12,220,828 B2
(45) Date of Patent: Feb. 11, 2025

(54) CARTRIDGE CONNECTOR AND RAZOR ASSEMBLY USING THE SAME

(71) Applicant: DORCO CO., LTD., Seoul (KR)

(72) Inventors: Jae Joon Lee, Seoul (KR); Sung Hee Son, Seoul (KR); Shin Hwan Park, Seoul (KR); Sang Hun Park, Seoul (KR)

(73) Assignee: DORCO CO. , LTD., Seoul (KR)

(*) Notice: Subject to any disclaimer, the term of this patent is extended or adjusted under 35 U.S.C. 154(b) by 0 days.

(21) Appl. No.: 18/182,252

(22) Filed: Mar. 10, 2023

(65) Prior Publication Data

US 2023/0211516 A1 Jul. 6, 2023

Related U.S. Application Data

(63) Continuation of application No. 16/920,393, filed on Jul. 2, 2020, now Pat. No. 11,613,036.

(30) Foreign Application Priority Data

Jul. 8, 2019 (KR) ........................ 10-2019-0082244

(51) Int. Cl.
*B26B 21/52* (2006.01)
*B26B 21/22* (2006.01)

(52) U.S. Cl.
CPC .......... *B26B 21/521* (2013.01); *B26B 21/225* (2013.01); *B26B 21/522* (2013.01)

(58) Field of Classification Search
CPC ......... B26B 21/06; B26B 21/10; B26B 21/14; B26B 21/16; B26B 21/165; B26B 21/22;
(Continued)

(56) References Cited

U.S. PATENT DOCUMENTS 5,687,485 A 11/1997 Shurtleff et al.
5,761,814 A 6/1998 Anderson et al.
(Continued)

FOREIGN PATENT DOCUMENTS

GB 2081165 2/1982
KR 100539659 12/2005
(Continued)

OTHER PUBLICATIONS

European Patent Office Application Serial No. 20184453.7, Search Report dated Dec. 11, 2020, 7 pages.
(Continued)

*Primary Examiner* — Jason Daniel Prone
(74) *Attorney, Agent, or Firm* — Knobbe, Martens, Olson, & Bear, LLP

(57) ABSTRACT

A razor assembly includes a razor cartridge comprising at least one shaving blade, and a blade housing configured to receive the at least one shaving blade in a first direction; a cartridge connector coupled to the razor cartridge such that the razor cartridge is rotatable with respect to the cartridge connector about a rotational axis parallel to the first direction; and a razor handle, wherein the cartridge connector further comprises: at least two first cantilevers configured to provide a recovering force to the razor cartridge to restore the razor cartridge to a rest position; at least one second cantilever coupled to at least a part of the razor handle; and an upper wall covering the at least one second cantilever, wherein the at least one second cantilever is not exposed to an outside by the upper wall when viewed from a bottom side of the blade housing.

20 Claims, 8 Drawing Sheets

(58) Field of Classification Search

CPC . B26B 21/222; B26B 21/225; B26B 21/4012; B26B 21/4037; B26B 21/52; B26B 21/521

USPC ........................................................ 30/47–51

See application file for complete search history.

(56) References Cited

U.S. PATENT DOCUMENTS

| | | | |
|---|---|---|---|
| 5,956,848 | A | 9/1999 | Tseng et al. |
| 5,956,851 | A | 9/1999 | Apprille et al. |
| 6,041,926 | A | 3/2000 | Petricca et al. |
| 6,052,903 | A | 4/2000 | Metcalf et al. |
| 6,185,822 | B1 | 2/2001 | Tseng et al. |
| 6,212,777 | B1 | 4/2001 | Gilder et al. |
| 6,442,839 | B1 | 9/2002 | Tseng et al. |
| 6,516,518 | B1 | 2/2003 | Garraway et al. |
| 6,612,040 | B2 | 9/2003 | Gilder |
| 6,684,513 | B1 | 2/2004 | Clipstone et al. |
| 8,079,147 | B2 | 12/2011 | Wonderley |
| 8,096,054 | B2 | 1/2012 | Denkert et al. |
| 9,193,077 | B2 | 11/2015 | Worrick |
| 9,630,331 | B2 | 4/2017 | Griffin et al. |
| 10,272,579 | B2 | 4/2019 | Wilson et al. |
| 10,272,580 | B2 | 4/2019 | Griffin et al. |
| 10,328,587 | B2 | 6/2019 | Griffin et al. |
| 10,350,774 | B2 | 7/2019 | Wilson et al. |
| 10,486,319 | B2 | 11/2019 | Provost et al. |
| 10,500,747 | B2 | 12/2019 | Tucker et al. |
| 10,543,611 | B2 | 1/2020 | Bozikis et al. |
| 10,639,807 | B2 | 5/2020 | Wilson et al. |
| 10,850,412 | B2 | 12/2020 | Harris |
| 10,919,167 | B2 | 2/2021 | Park et al. |
| 10,974,403 | B2 | 4/2021 | Chang |
| 10,974,404 | B2 | 4/2021 | Griffin et al. |
| 11,034,038 | B2 | 6/2021 | Chang et al. |
| 11,123,890 | B2 | 9/2021 | Jang et al. |
| 11,167,437 | B2 | 11/2021 | Coresh |
| 11,247,355 | B2 | 2/2022 | Han et al. |
| 11,247,358 | B2 | 2/2022 | Hashimoto |
| 11,273,564 | B2 | 3/2022 | Park et al. |
| 11,292,143 | B2 | 4/2022 | Park et al. |
| 11,298,843 | B2 | 4/2022 | Kopelas et al. |
| 11,325,270 | B2 | 5/2022 | Griffiin et al. |
| 11,345,056 | B1 * | 5/2022 | Wang .................... B26B 21/521 |
| 11,613,036 | B2 * | 3/2023 | Lee ....................... B26B 21/521 30/527 |
| 2005/0188539 | A1 | 9/2005 | Prudden et al. |
| 2011/0088269 | A1 | 4/2011 | Walker et al. |
| 2012/0210586 | A1 | 8/2012 | Lelieveld et al. |
| 2013/0081290 | A1 | 4/2013 | Murgida et al. |
| 2014/0116211 | A1 | 5/2014 | Griffin et al. |
| 2014/0331501 | A1 | 11/2014 | Erndt et al. |
| 2017/0080585 | A1 * | 3/2017 | Griffin .................. B26B 21/521 |
| 2018/0272549 | A1 | 9/2018 | Son et al. |
| 2019/0315006 | A1 | 10/2019 | Park et al. |
| 2020/0039098 | A1 | 2/2020 | Kopelas et al. |
| 2020/0180178 | A1 | 6/2020 | Park et al. |
| 2020/0290226 | A1 | 9/2020 | Lucchese |
| 2021/0008743 | A1 | 1/2021 | Lee et al. |
| 2021/0008745 | A1 | 1/2021 | Kruemke et al. |
| 2021/0069923 | A1 | 3/2021 | Han et al. |
| 2021/0213630 | A1 | 7/2021 | Chatzigrigoriou et al. |
| 2021/0308890 | A1 | 10/2021 | Provost et al. |
| 2021/0379777 | A1 | 12/2021 | Kopelas |
| 2022/0016794 | A1 | 1/2022 | Jang et al. |

FOREIGN PATENT DOCUMENTS

| | | |
|---|---|---|
| KR | 101743128 | 5/2017 |
| KR | 101774370 | 8/2017 |
| WO | 2011057170 | 5/2011 |
| WO | 2012158143 | 11/2012 |

OTHER PUBLICATIONS

European Search Report dated Oct. 2, 2023 in European Application No. 23160695.5.

Korean Intellectual Property Office Application No. 10-2019-0082244, Office Action dated Jan. 5, 2021, 5 pages.

* cited by examiner

CARTRIDGE CONNECTOR AND RAZOR ASSEMBLY USING THE SAME

This application is a continuation of U.S. patent application Ser. No. 16/920,393 filed on Jul. 20, 2020, now U.S. Pat. No. 11,613,036, issued on Mar. 28, 2023, which pursuant to 35 U.S.C. § 119 (a), claims the benefit of earlier filing date and right of priority to Korean Patent Application No. 10-2019-0082244, filed on Jul. 8, 2019, the contents of which are hereby incorporated by reference herein in its entirety.

BACKGROUND OF THE PRESENT DISCLOSURE

1. Field of the Invention

The present disclosure relates to a cartridge connector and a razor assembly using the same.

2. Description of the Related Art

The statements in this section merely provide background information related to the present disclosure and may not constitute prior art.

In recent years, many multifunctional razors with several functions in addition to the function of simply cutting body hair have been introduced.

For example, Korean Patent No. 10-1774370 (hereinafter referred to as Patent Document 1), which relates to one of the conventional multifunctional razors, discloses using an eccentric cam to provide a function of reciprocating linear motion to a razor cartridge.

Another conventional multifunctional razor is configured to provide a feeling of warmth to a user during shaving by heating the razor cartridge by applying electric current to the razor cartridge.

Another conventional multifunctional razor is configured to store a shaving aid in a razor handle and eject the stored shaving aid onto a razor cartridge.

Such conventional multifunctional razors are generally provided with a complicated component such as an electronic component or a pump inside the razor handle, and are also provided with a separate member (hereinafter referred to as a "function providing portion") connecting the razor cartridge and the razor handle.

For example, the multifunctional razor of Patent Document 1 includes an electronic component such as a battery and an electric motor in a razor handle, and also includes a function providing portion such as an eccentric cam member extending from the razor handle to contact one side of the razor cartridge.

Such a conventional multifunctional razor has a complicated element inside the razor handle, and necessarily has a function providing portion for connecting the razor handle to the razor cartridge. Accordingly, the razor cartridge is often integrated with the razor handle.

Accordingly, when the razor blade is old or the razor cartridge is damaged, the razor may need to be replaced with a whole new multifunctional razor.

Further, a conventional plunger including a spring is disposed in the middle of the razor handle and configured to press the rear surface of the razor cartridge. For the conventional multifunction razor, a function providing portion is arranged in the middle of the razor handle, and accordingly it is difficult to directly employ the plunger.

As a result, it is difficult to implement an appropriate pivot motion of the razor cartridge.

BRIEF SUMMARY

Therefore, the present disclosure has been made in view of the above problems, and it is an object of the present disclosure to provide a razor assembly that is provided with a razor cartridge detachably attached to a razor handle, and is capable of providing an appropriate pivot motion to the razor cartridge in a multifunction razor.

In accordance with the present disclosure, the above and other objects can be accomplished by the provision of a razor assembly including a razor cartridge comprising at least one shaving blade having a cutting edge, and a blade housing configured to receive the at least one shaving blade such that the at least one shaving blade extends in a first direction corresponding to a width direction of the razor cartridge; a cartridge connector coupled to the razor cartridge such that the razor cartridge is rotatable with respect to the cartridge connector about a rotational axis parallel to the first direction; and a razor handle, wherein the cartridge connector further comprises: at least two first cantilevers configured to provide a recovering force to the razor cartridge to restore the razor cartridge to a rest position when the razor cartridge rotates with respect to the cartridge connector; at least one second cantilever coupled to at least a part of the razor handle; and an upper wall covering the at least one second cantilever, wherein the at least one second cantilever is not exposed to an outside by the upper wall when viewed from a bottom side of the blade housing.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
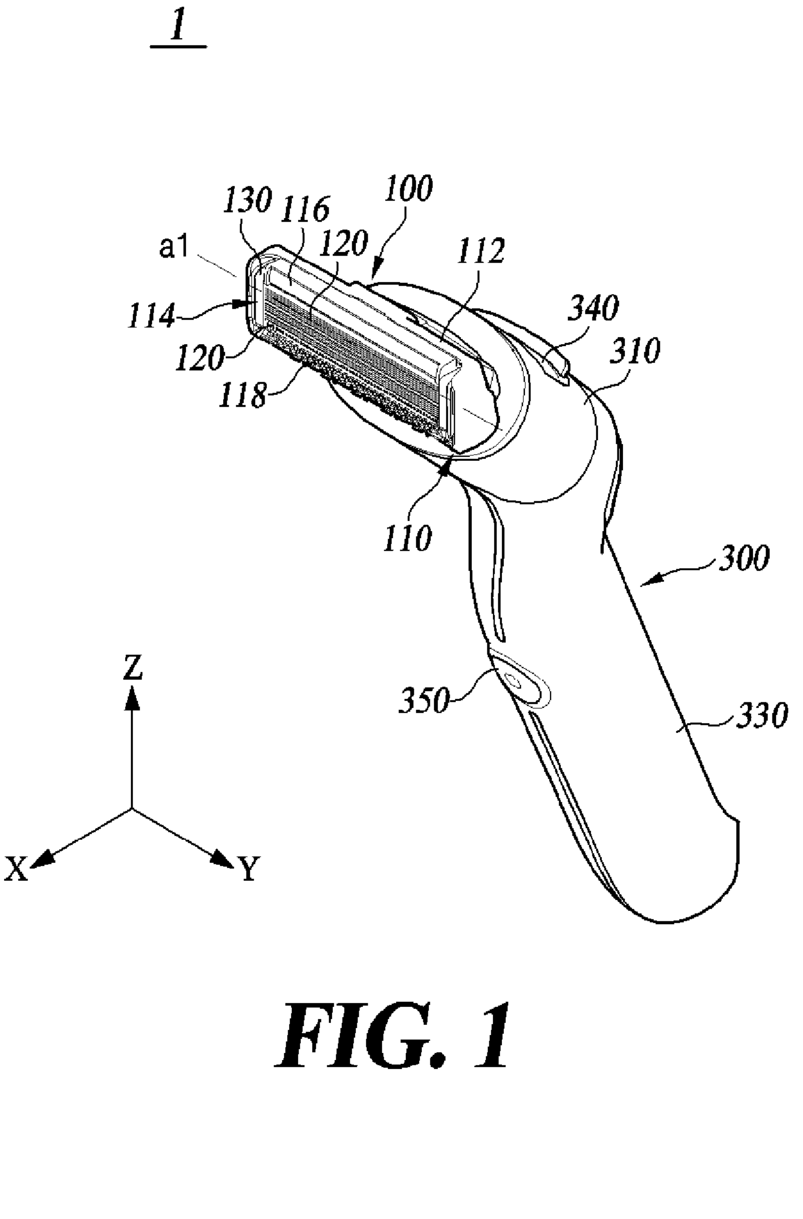
FIG. 1 is a front perspective view of a razor assembly according to an embodiment of the present disclosure.

Hereinafter, some embodiments of the present disclosure will be described in detail with reference to exemplary drawings. It should be noted that in assigning reference numerals to components in each drawing, the same reference numbers will be used throughout the drawings to refer to the same or like components even though the components are shown in different drawings. In addition, in describing the present disclosure, detailed descriptions of related known elements or functions will be omitted to avoid obscuring the subject matter of the present disclosure.

In describing the components of embodiments according to the present disclosure, terms including ordinal numbers such as first, second, i), ii), a), and b) may be used. These terms are merely used to distinguish one component from another, and the essence or order of the components is not limited by the terms. In the specification, when it is stated that a part "includes" or "has" a component, this means that the part may further include other components, rather than excluding other components, unless explicitly stated otherwise.

FIG. 1 is a front perspective view of a razor assembly 1 according to an embodiment of the present disclosure.

Figure 2:
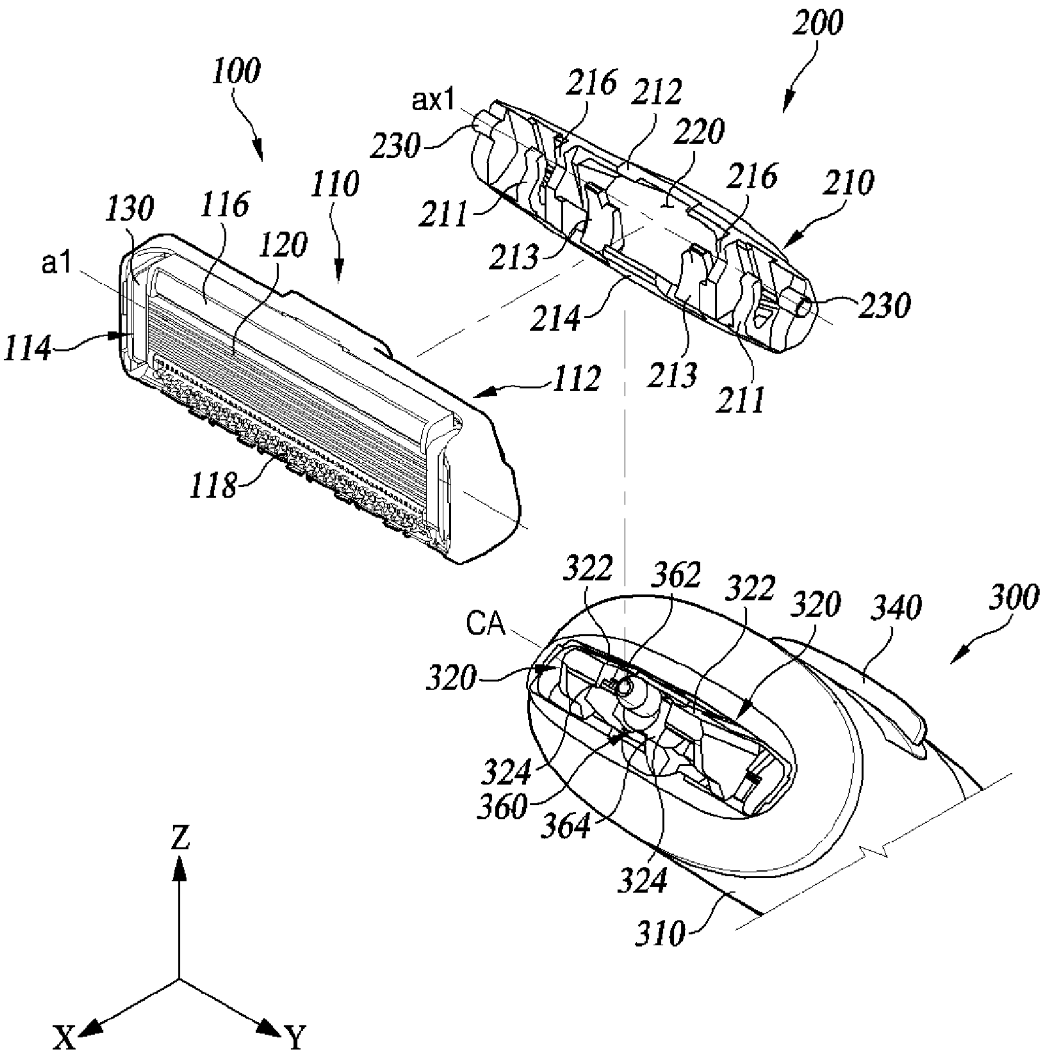
FIG. 2 is an exploded perspective view of the razor assembly shown in FIG. 1.

FIG. 2 is an exploded perspective view of the razor assembly 1 shown in FIG. 1.

Referring to FIGS. 1 and 2, the razor assembly 1 may include a razor cartridge 100, a cartridge connector 200, and a razor handle 300.

The razor cartridge 100 may include a blade housing 110, a shaving blade 120, and a clip 130.

The blade housing 110 may include a guiding housing 112, a blade mounting portion 114, a cap 116, and a guard 118.

The guiding housing 112 may accommodate the blade mounting portion 114.

The blade mounting portion 114 accommodated in the guiding housing 112 may make reciprocating linear motion with respect to the guiding housing 112.

In this case, the reciprocating linear motion of the blade mounting portion 114 may be performed in a direction (Z-axis direction in FIG. 1) parallel to the shaving direction.

When the blade mounting portion 114 makes reciprocating linear motion, the cutting speed of the shaving blade 120 may be the sum of the speed at which the user performs shaving by hand and the speed by the linear motion of the blade mounting portion 114. Thus, cutting body hair may be performed very quickly.

In addition, in cutting body hair, the linear motion of the blade mounting portion 114 may reduce the cut surface of the body hair by reducing tugging, which refers to an action of the shaving blade 120 pulling the body hair. Thereby, clean shaving may be achieved.

The blade mounting portion 114 may accommodate at least one shaving blade 120 having a cutting edge 122 (see FIGS. 6A and 6B) in a lateral direction al.

Specifically, at least one shaving blade 120 may be retained by a plurality of clips 130 while being accommodated on one side of the blade mounting portion 114.

The cap 116 may be located behind the shaving blade 120. Specifically, it may be disposed on a front side of the blade housing 110 facing the cutting edge.

The guard 118 may be located in front of the shaving blade 120 on the front side of the blade housing 110.

In shaving, the guard 118 may stretch the skin in the shaving direction before cutting of the body hair by the shaving blade 120.

Thus, the user's body hair may rise in a direction perpendicular to the user's skin surface, whereby the shaving blade 120 may more easily cut the body hair.

The cap 116 and the guard 118 are illustrated in FIGS. 1 and 2 as being disposed on the blade mounting portion 114, the present disclosure is not limited thereto. For example, the cap and the guard may be disposed on the guiding housing 112.

The clip 130 may retain the shaving blade 120 on the blade mounting portion 114. Thereby, the shaving blade 120 may be prevented from being detached from the blade mounting portion 114.

The cartridge connector 200 may include a connector body 210 and a hollow receiving space 220.

The connector body 210 may be coupled to the razor cartridge 100 so as to rotate about a rotational axis RA parallel to the lateral direction.

Specifically, the boss 230 of the connector body 210 may be inserted into a boss hole 1122 (see FIG. 4) of the guiding housing 112, thereby defining the rotation axis RA.

In this way, the razor cartridge 100 may pivot about the rotation axis RA with respect to the cartridge connector 200.

A first cantilever 211, also represented as a recovering force providing unit, and a second cantilever 213, also represented as a coupling portion, may extend from the connector body 210.

The first cantilever 211 may provide the razor cartridge 100 with recovering force that restores the razor cartridge 100 to a rest position when the razor cartridge 100 pivots.

The second cantilever 213 may be latch-coupled to a handle coupling portion 320 of the razor handle 300. Thereby, the cartridge connector 200 may be coupled to the razor handle 300.

The receiving space 220 may be disposed on one side of the connector body 210 to accommodate the handle coupling portion 320.

The razor handle 300 may include a handle body 310, a handle coupling portion 320, a grip portion 330, an ejecting button 340, an operation button 350, and a function providing portion 360.

The handle coupling portion 320 may extend from one side of the handle body 310 and be detachably coupled to the connector body 210.

For example, when the razor handle 300 is mounted on the cartridge connector 200, the handle coupling portion 320 and the second cantilever 213 may be coupled. According to an embodiment of the present disclosure, the handle coupling portion 320 and the second cantilever 213 may be latch-coupled.

On the other hand, when the razor handle 300 is detached from the cartridge connector 200, the coupling between the handle coupling portion 320 and the second cantilever 213 may be released.

The grip portion 330 may extend from the opposite side of the handle body 310 and may provide a user with an area for gripping the razor assembly 1.

The ejecting button 340 may be disposed on one surface of the handle body 310. The user may detach the cartridge connector 200 from the razor handle 300 by operating the ejecting button 340.

For example, the user may release the coupling between the second cantilever 213 and the handle coupling portion 320 through an operation of pushing the ejecting button 340.

The operation button 350 may be disposed on one surface of the grip portion 330. The user may operate the function providing portion 360 by operating the operation button 350.

For example, when the function providing portion 360 provides a linear motion function to the razor cartridge 100, the user may operate, through an operation of pressing the operation button 350, a motor connected to the eccentric cam body 364 of the function providing portion 360.

In FIGS. 1 and 2, the ejecting button 340 is illustrated as being disposed on the handle body 310 and the operation button 350 is illustrated as being disposed on the grip portion 330. However, the present disclosure is not limited thereto.

For example, the ejecting button 340 may be disposed on the grip portion 330, or the operation button 350 may be disposed on the handle body 310.

The function providing portion 360 may provide one or more functions to the razor cartridge 100. For example, the function providing portion 360 may provide a linear motion function to the razor cartridge 100.

The function providing portion 360 may extend from the handle coupling portion 320 toward the razor cartridge 100 to provide a function to the razor cartridge 100.

At least a part of the function providing portion 360 may be disposed in the receiving space 220.

Figure 3:
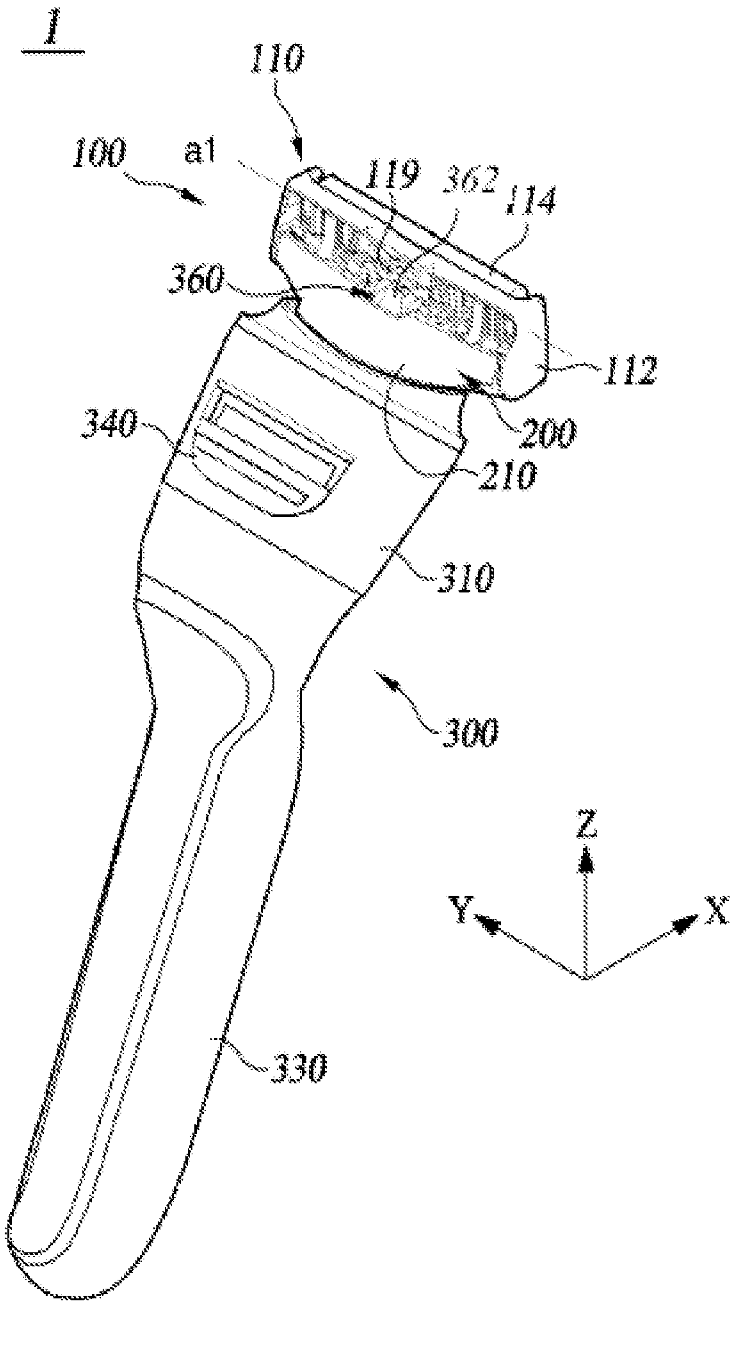
FIG. 3 is a rear perspective view of a razor assembly according to an embodiment of the present disclosure.

FIG. 3 is a rear perspective view of the razor assembly 1 according to an embodiment of the present disclosure.

Figure 4:
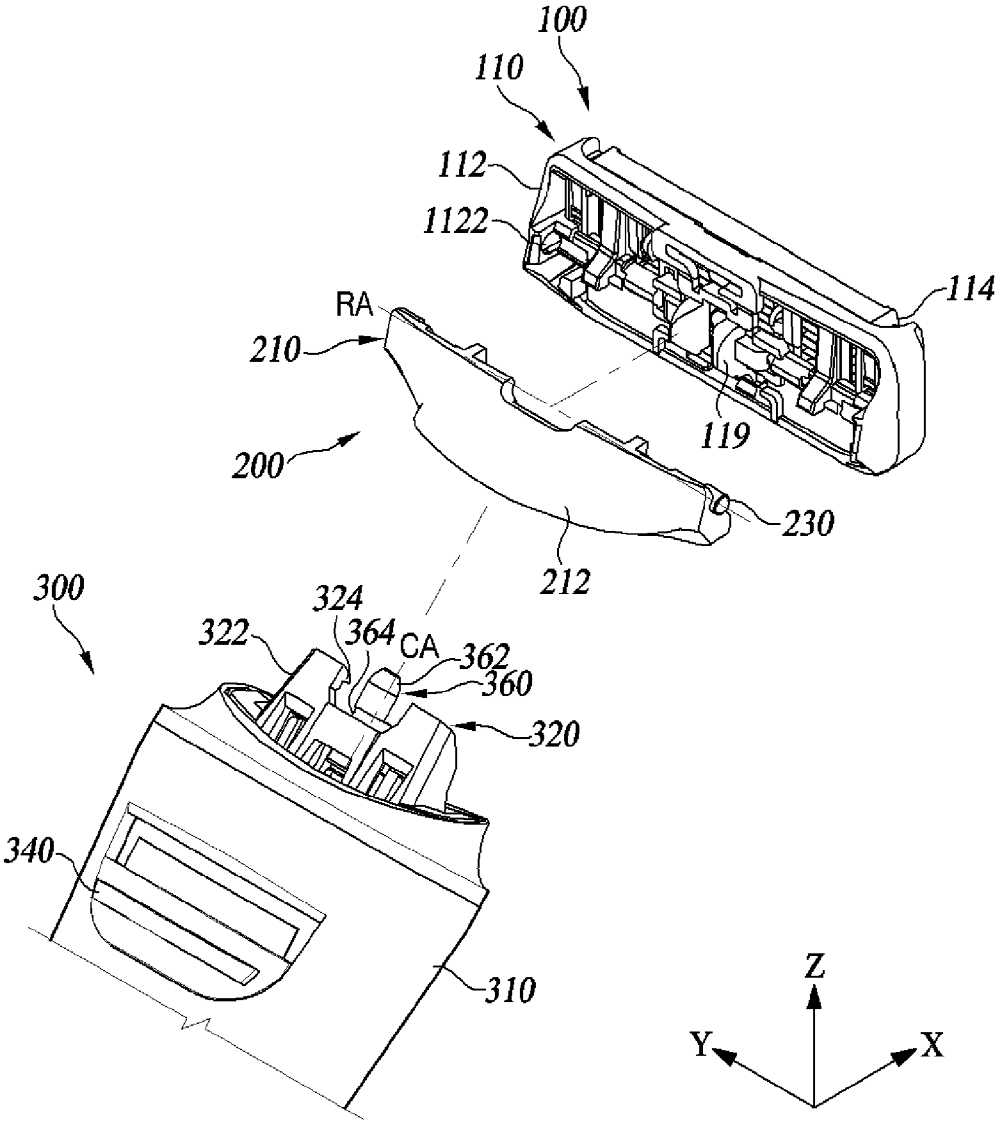
FIG. 4 is an exploded perspective view of the razor assembly shown in FIG. 3.

FIG. 4 is an exploded perspective view of the razor assembly 1 shown in FIG. 3.

Referring to FIGS. 3 and 4, the blade housing 110 may include a drive receiving portion 119.

The drive receiving portion 119 may be disposed on the rear side of the blade housing 110.

Specifically, the drive receiving portion 119 may be connected to the rear side of the guiding housing 112 so as to perform a cam action with the blade mounting portion 114.

The drive receiving portion 119 may contact the eccentric cam head 362 of the function providing portion 360 to make a reciprocating linear motion with respect to the guiding housing 112 in a direction (the Y-axis direction in FIG. 3) perpendicular to the shaving direction.

In this case, the vertical linear motion of the drive receiving unit 119 may be converted into a horizontal linear motion of the blade mounting portion 114 by a cam action between the drive receiving portion 119 and the blade mounting portion 114.

While the drive receiving portion 119 is illustrated in FIGS. 3 and 4 as making a reciprocating linear motion in a direction perpendicular to the shaving direction, the present disclosure is not limited thereto.

For example, the drive receiving portion 119 may be configured to make a reciprocating linear motion with respect to the guiding housing 112 in a direction (Z-axis direction of FIG. 3) parallel to the shaving direction, such that the blade mounting portion 114 makes a reciprocating linear motion in the direction parallel to the shaving direction.

In this case, the drive receiving portion 119 and the blade mounting portion 114 may be integrated or may be connected to each other such that the positions thereof are fixed.

The function providing portion 360 may include an eccentric cam head 362 and an eccentric cam body 364.

The eccentric cam body 364 may rotate around a central axis CA passing through the eccentric cam body 364.

The eccentric cam head 362 may protrude toward the razor cartridge 100 from the eccentric cam body 364, away from the central axis CA.

When the eccentric cam body 364 rotates, the eccentric cam head 362 may rotate eccentrically.

At least a part of the eccentric cam head 362 may be accommodated in the drive receiving portion 119.

Accordingly, the eccentric cam head 362 may repeatedly contact both side walls of the drive receiving portion 119 during eccentric rotation. Accordingly, the function providing portion 360 may cause the drive receiving portion 119 to make a reciprocating linear motion.

While the function providing portion 360 is illustrated in FIGS. 1 to 4 as providing a linear motion function to the razor cartridge 100, the present disclosure is not limited thereto.

For example, the function providing portion 360 may include a heating function of warming the razor cartridge 100, or a shaving aid jetting function of jetting a shaving aid on the razor cartridge 100.

When the function providing portion 360 provides the heating function to the razor cartridge 100, the function providing portion 360 may be electrically connected to the razor cartridge 100.

To this end, the function providing portion 360 may include an electric circuit or an electric wire for applying current.

The function providing portion 360 may heat the shaving cartridge 100 by applying current to the shaving cartridge 100. Thus, the razor cartridge 100 may deliver a feeling of warmth to a user during shaving.

When the function providing portion 360 provides the shaving aid jetting function to the razor cartridge 100, the function providing portion 360 may be configured to deliver the shaving aid stored in the razor handle 300 to the razor cartridge 100.

To this end, a fluid tube for fluid delivery may be inserted into the function providing portion 360.

The shaving aid delivered to the razor cartridge 100 may be jetted from the razor cartridge 100. This allows the user to apply the shaving aid to the user's skin while shaving.

While it is illustrated in FIGS. 1 to 4 that the blade housing 110 includes the guiding housing 112, the blade mounting portion 114, and the drive receiving portion 119, and the function providing portion 360 includes the eccentric cam head 362 and the eccentric cam body 364, this is merely a configuration for the function providing portion 360 to provide the linear motion function, and the present disclosure is not limited thereto.

Accordingly, the function providing portion 360 and the blade housing 110 may be configured according to the function provided by the function providing portion 360 to the razor cartridge 100.

Figure 5A:
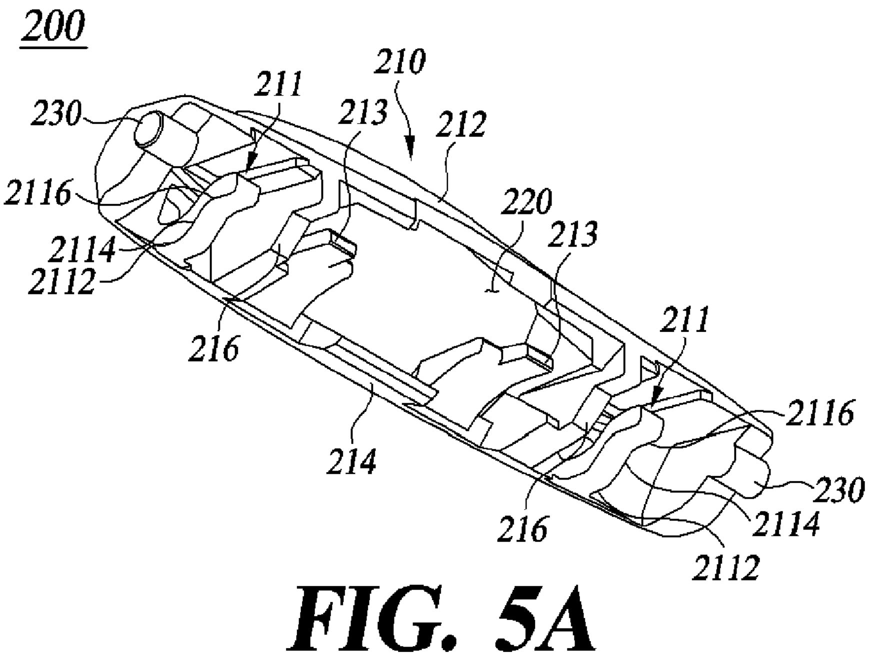
FIGS. 5A, 5B, and 5C show a cartridge connector according to an embodiment of the present disclosure.
Figure 5B:
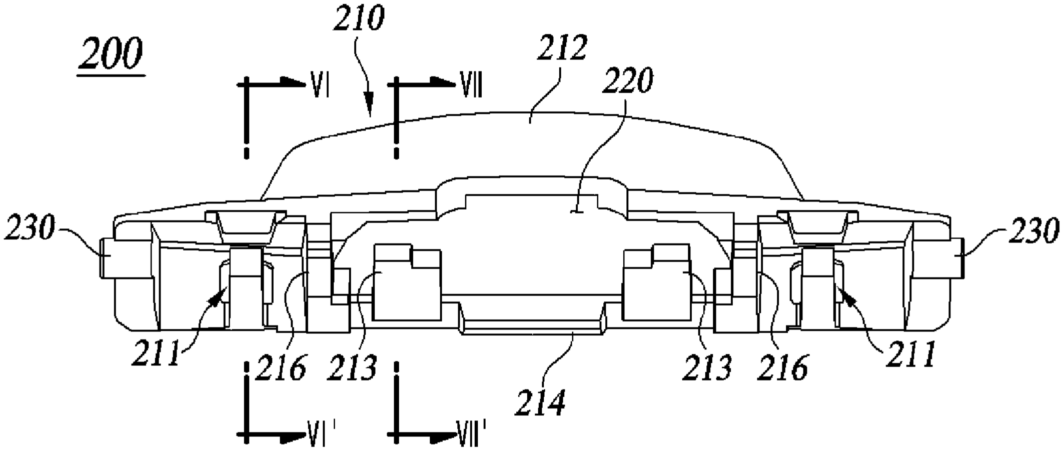
Figure 5C:
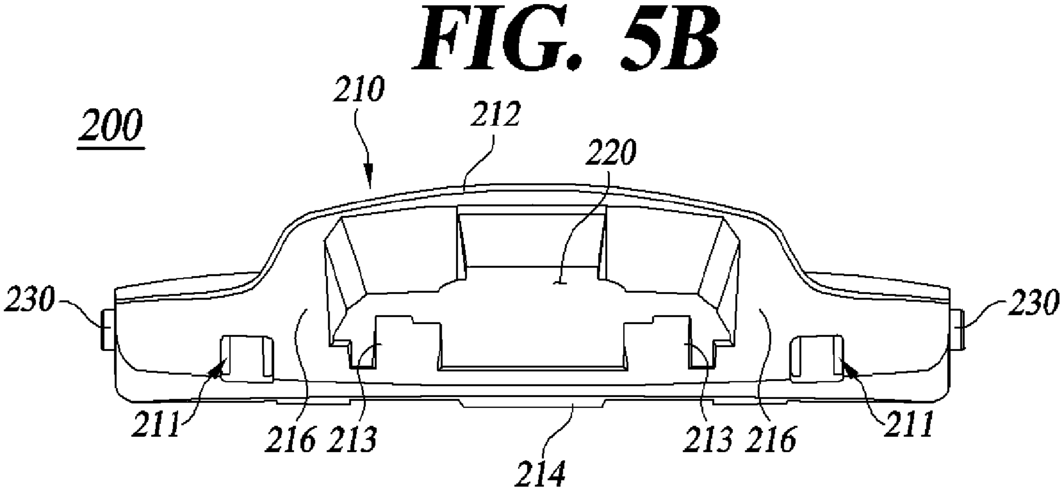

FIGS. 5A, 5B, and 5C show a cartridge connector 200 according to an embodiment of the present disclosure.

Specifically, FIG. 5A is a perspective view of the cartridge connector 200, FIG. 5B is a front view of the cartridge connector 200, and FIG. 5C is a rear view of the cartridge connector 200.

Referring to FIGS. 5A to 5C, the connector body 210 may include an upper wall 212, a lower wall 214 facing the upper wall 212, two side walls 216 disposed between the upper wall 212 and the lower walls 214.

The upper wall 212, the lower wall 214, and the two side walls 216 may define the receiving space 220.

The connector body 210 may include two first cantilevers 211 and two second cantilevers 213.

The first cantilevers 211 and the second cantilevers 213 may extend from any one of the upper wall 212 and the lower wall 214.

The first cantilevers 211 may be disposed more spaced apart from the handle coupling portion 320 than the second cantilevers 213, with the handle coupling portion 320 accommodated in the receiving space 220. However, the present disclosure is not limited thereto.

For example, the first cantilevers 211 may be disposed closer to the handle coupling portion 320 than the second cantilevers 213.

Further, the second cantilevers 213 may be disposed closer to the center of the cartridge connector 200 than in the example shown in FIG. 5.

The first cantilevers 211 and the second cantilevers 213 may extend forward on the connector body 210 toward the razor cartridge 100.

The first cantilevers 211 may provide the razor cartridge 100 with recovering force to return the razor cartridge 100 to a rest position through elastic deformation.

The first cantilever 211 may include a base portion 2112, a connecting portion 2114, and a contacting portion 2116.

In the first cantilever 211, the base portion 2112, the connecting portion 2114, and the contacting portion 2116 may be disposed in this order and form a zigzag shape when viewed as a whole.

The second cantilevers 213 may be configured to latch-couple to one side of the handle coupling portion 320 while the handle coupling portion 320 is accommodated in the receiving space 220.

The function providing portion 360 may be arranged between the two first cantilevers 211 and between the two second cantilever 213 in the receiving space 220.

The razor assembly 1 according to an embodiment of the present disclosure is characterized in that an area through which the function providing portion 360 may pass is provided on the cartridge connector 200 by disposing the first cantilevers 211 and the second cantilevers 213 on both sides of the function providing portion 360.

Thus, the razor assembly 1 according to an embodiment of the present disclosure may provide various functions to the razor cartridge 100 through the function providing portion 360, while providing a pivot function and a detachable attachment function to the razor cartridge 100.

The cartridge connector 200 including the first cantilever 211 and the second cantilever 213 may be manufactured as an integral part through injection molding, and accordingly may be easier to manufacture than conventional products. In addition, when injection molding is employed, physical properties such as the elastic modulus of the first cantilever 211 and the second cantilever 213 may be configured differently for the cartridge connector 200 through double-shot injection molding.

Thus, even when the entire cartridge connector 200 is integrally formed, the first cantilever 211 and the second cantilever 213 may have physical properties suitable for the pivot function and the detachable attachment function.

Referring back to FIG. 3, at least one part of the function providing portion 360, the first cantilevers 211, and the second cantilevers 213 may be covered by the upper wall 212 and thus may not be exposed to the outside (e.g., invisible when viewed from an outer surface of the connector body 210). To this end, the width of the upper wall 212 in the detachment direction may be greater than the length of the first cantilever 211 and the length of the second cantilever 213 so as to sufficiently cover the first cantilevers 211 and the second cantilevers 213, or may be equal to the length of the longer one of the first cantilever 211 and the second cantilever 213.

Here, the detachment direction refers to the direction of movement of the handle coupling portion 320 that is made with respect to the cartridge connector 200 when the razor handle 300 is mounted on the cartridge connector 200 or detached from the cartridge connector 200. In this case, the detachment direction may be perpendicular to the lateral direction.

The razor assembly 1 according to an embodiment of the present disclosure may have an appearance advantage by preventing more or less complicated shapes such as at least a part of the function providing portion 360, the first cantilevers 211 and the second cantilevers 213 from being exposed to the outside.

In addition, the razor assembly 1 according to an embodiment of the present disclosure may prevent at least a part of the function providing portion 360, the first cantilever 211, the second cantilever 213, and the like, thereby protecting such members from external impact.

While FIGS. 5A-5C illustrate that two first cantilevers 211 and two second cantilevers 213 are provided, the present disclosure is not limited thereto.

For example, the cartridge connector 200 may include three or more first cantilevers 211, or may include one second cantilever 213.

Figure 6A:
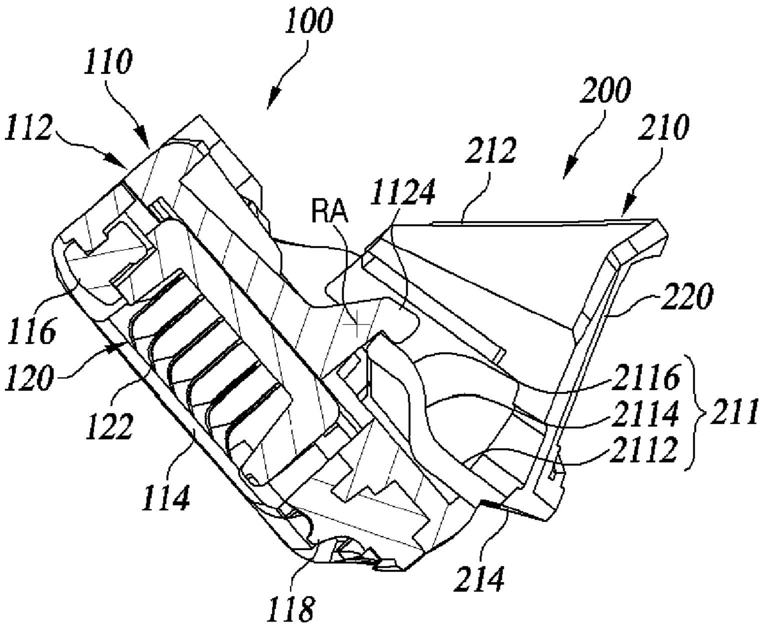
FIGS. 6A and 6B are exemplary views illustrating a razor cartridge pivoting around a cartridge connector according to an embodiment of the present disclosure.
Figure 6B:
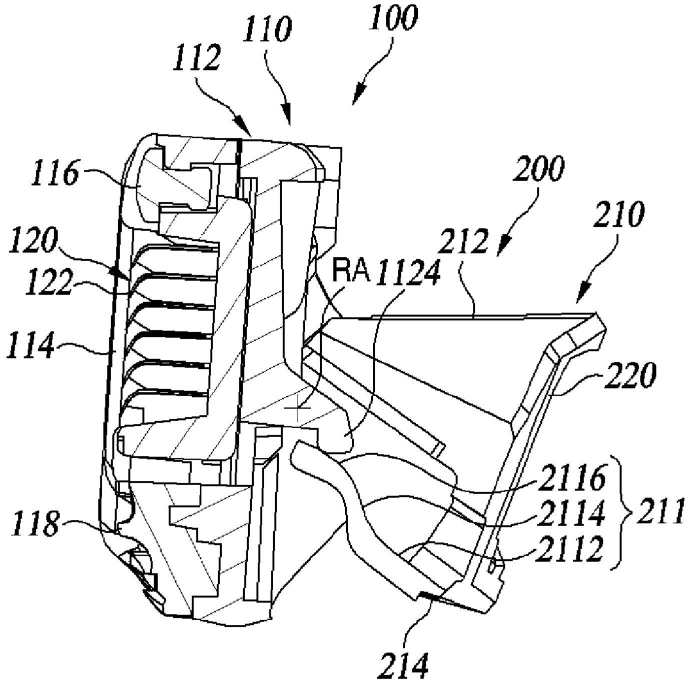

FIGS. 6A and 6B are exemplary views illustrating the razor cartridge 100 pivoting around the cartridge connector 200 according to an embodiment of the present disclosure.

Specifically, FIGS. 6A and 6B show the cross-sections of the razor cartridge 100 and the cartridge connector 200, taken along line VI-VI' of FIG. 5B.

FIG. 6A shows the cross-sections when the razor cartridge 100 is in a rest position, FIG. 6B shows the cross-section when the razor cartridge 100 is pivoted away from the rest position.

In FIG. 6, for convenience of description, illustration of the razor handle 300 is omitted.

Referring to FIG. 6A, the razor cartridge 100 may include a plurality of pressing protrusions 1124 protruding from one side of the blade housing 110.

The pressing protrusions 1124 may be disposed on the blade housing 110 at positions corresponding to the first cantilevers 211.

When the razor cartridge 100 is in the rest position, the pressing protrusion 1124 may contact the contacting portion 2116 of the first cantilever 211.

Specifically, the pressing protrusion 1124 may contact the contacting portion 2116 by hanging on the upper side of the contacting portion 2116.

In the rest position, elastic deformation does not occur on the first cantilever 211, and accordingly, the first cantilever 211 may remain not providing the recovering force to the razor cartridge 100.

Referring to FIG. 6B, when the razor cartridge 100 pivots around the cartridge connector 200, the first cantilever 211 may be elastically deformed in contact with the pressing protrusion 1124.

Specifically, the razor cartridge 100 may pivot clockwise in FIG. 6B, and accordingly the pressing protrusion 1124 may also pivot clockwise.

The pressing protrusion 1124 pivoting clockwise may press the contacting portion 2116 downward on the upper side of the contacting portion 2116, and accordingly the first cantilever 211 may be elastically deformed downward.

As the first cantilever 211 is elastically deformed downward, elastic force may be applied to the pressing protrusion 1124 upward.

The elastic force applied upward may restore the pressing protrusion 1124 or the razor cartridge 100 counterclockwise. Thus, the razor cartridge 100 may be restored to the rest position.

The second cantilever 213 may be configured not to contact the razor cartridge 100 when the razor cartridge 100 pivots around the cartridge connector 200.

The razor assembly 1 according to the embodiment of the present disclosure does not include a conventional plunger including an elastic member such as a spring, but may use elastically deformable cantilevers to provide recovering force to the razor cartridge 100, which is a technical feature of the embodiment.

Accordingly, the razor assembly 1 according to an embodiment of the present disclosure may provide sufficient recovering force to the razor cartridge 100 using a simpler structure called a cantilever.

Referring to FIGS. 6A and 6B, the first cantilever 211 may include a base portion 2112, a connecting portion 2114, and a contacting portion 2116.

The base portion 2112 may extend from the lower wall 214, the connecting portion 2114 may extend from one end of the base portion 2112 in a curved manner, and the contacting portion 2116 may extend from one end of the connecting portion 2114 in a curved manner.

In addition, one end of the contacting portion 2116 may be configured to contact one side of the razor cartridge 100.

Accordingly, the first cantilever 211 may have a zigzag shape.

Since the first cantilever 211 has a zigzag shape, elastic deformation occurring on the first cantilever 211 may be divided into the base portion 2112, the connecting portion 2114, and the contacting portion 2116.

Thereby, excessive elastic deformation of a specific area of the first cantilever 211 may be prevented from leading to fatigue failure.

The rotational axis RA may extend through at least a part of the pressing protrusion 1124. Accordingly, the distance between the area of the pressing protrusion 1124 contacting the contacting portion 2116 and the rotational axis RA may be reduced.

Thereby, when the razor cartridge 100 pivots, the degree to which the pressing protrusion 1124 presses the contacting portion 2116 and the degree of elastic deformation occurring on the first cantilever 211 may be reduced.

Accordingly, the first cantilever 211 may be manufactured using a material having a greater modulus of elasticity or a greater stiffness. Thereby, the durability of the first cantilever 211 may be improved.

Figure 7A:
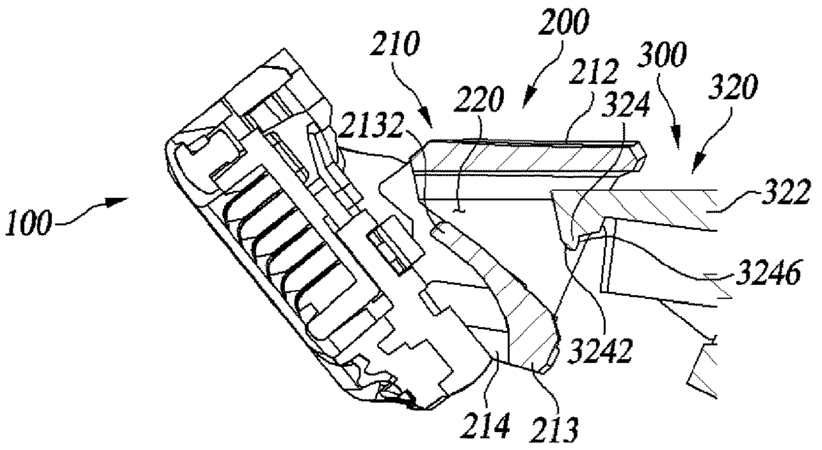
FIGS. 7A, 7B, and 7C are exemplary views illustrating mounting of a razor handle on a cartridge connector according to an embodiment of the present disclosure.
Figure 7B:
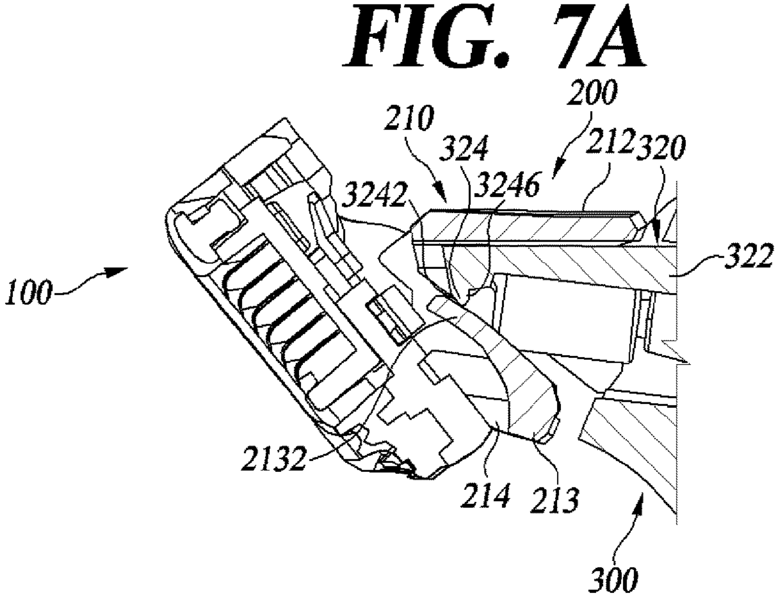
Figure 7C:
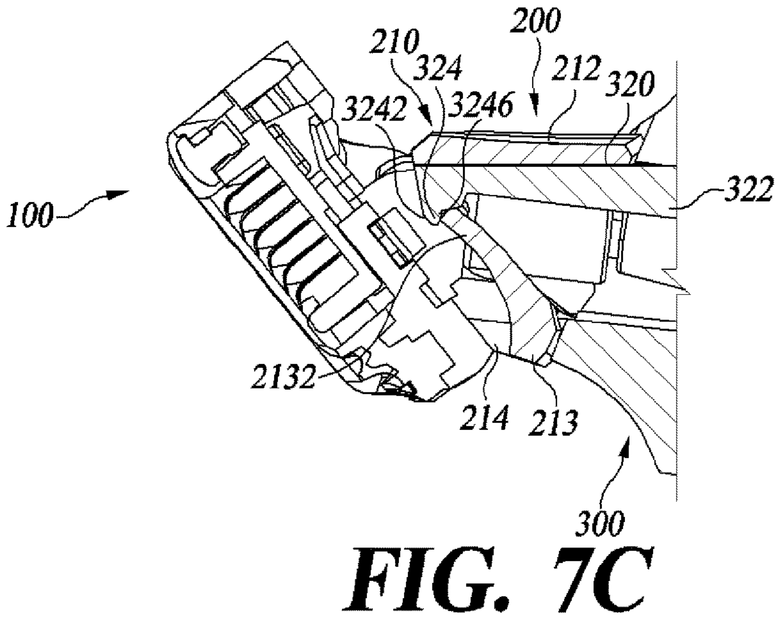

FIGS. 7A, 7B, and 7C are exemplary views illustrating mounting of a razor handle on a cartridge connector according to an embodiment of the present disclosure.

Specifically, FIGS. 7A-7C show a cross-section of the razor assembly 1, taken along line VII-VII' of FIG. 5B.

FIGS. 7A to 7C show mounting of the handle coupling portion 320 on the cartridge connector 200 in order.

Referring to FIGS. 7A to 7C, the handle coupling portion 320 may include a coupling portion body 322, a latch protrusion 324, a cam surface 3242, and a locking surface 3246.

The latch protrusion 324 may be formed at one end of the coupling body 322 so as to protrude downward toward the second cantilever 213. Here, the downward direction refers to a direction in which the coupling portion body 322 faces the lower wall 214 with the handle coupling portion 320 accommodated in the cartridge connector 200.

The cam surface 3242, which is capable of performing a cam action with the second cantilever 213, may be formed at front of the latch protrusion 324.

In addition, the locking surface 3246, which may be latch-coupled to the second cantilever 213, may be formed at the rear of the latch protrusion 324.

Referring to FIGS. 7A and 7B, while the coupling portion body 322 is inserted into the receiving space 220 of the cartridge connector 200, the latch projection 324 contacts a free end 2132 of the second cantilever 213.

In this case, a cam action may occur between the cam surface 3242 formed on the latch protrusion 324 and the free end 2132. The free end 2132 may be elastically deformed downward by the cam action.

Referring to FIGS. 7B and 7C, the coupling portion body 322 may be further inserted toward the front in the receiving space 220 of the cartridge connector 200.

While the coupling portion body 322 is continuously inserted forward, the latch protrusion 324 may pass through the free end 2132, and accordingly the cam action between the cam surface 3242 and the free end 2132 may not occur anymore.

The free end 2132 may be restored upward by the elastic force generated in the second cantilever 213.

In this case, the locking surface 3246 formed on the latch protrusion 324 may face the free end 2132, and accordingly the latch protrusion 324 may be latch-coupled to the free end 2132.

Through the latch coupling, the handle coupling portion 320 may be prevented from moving rearward with respect to the cartridge connector 200. Thus, the cartridge connector 200 may be mounted on the razor handle 300.

Conversely, the user may press the free end 2132 forward through an operation of pushing the ejecting button 340 (see FIG. 3) forward with the cartridge connector 200 mounted on the razor handle 300.

Then, the latch coupling between the latch protrusion 324 and the free end 2132 may be released, whereby the cartridge connector 200 may be released from the razor handle 300.

While the second cantilever 213 is illustrated in FIGS. 7A-7C as extending from the lower wall 214 of the cartridge connector 200, the present disclosure is not limited thereto.

Figure 8A:
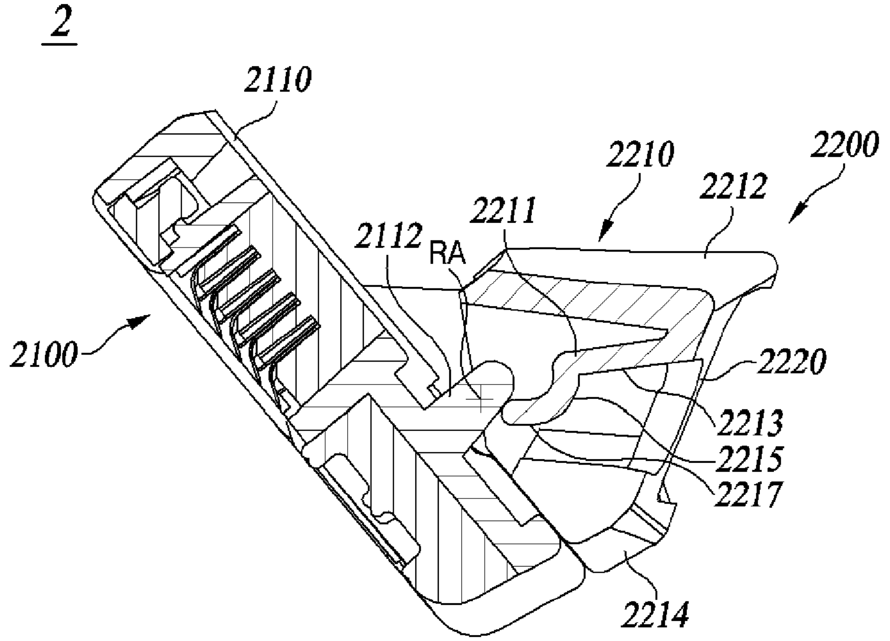
FIGS. 8A and 8B are exemplary views illustrating a razor cartridge pivoting around a cartridge connector according to another embodiment of the present disclosure.
Figure 8B:
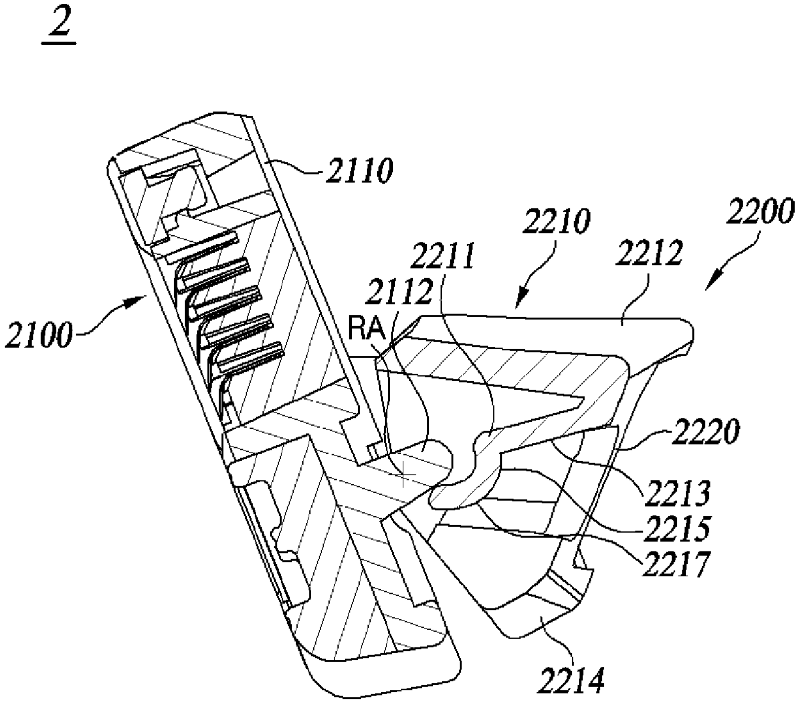

For example, the second cantilever 213 may extend from the upper wall 212 of the cartridge connector 200. In this case, the latch protrusion 324 may protrude upward from one end of the coupling portion body 322 toward the second cantilever 213. Here, the upward direction, which is a direction opposite to the downward direction, refers to a direction in which the coupling portion body 322 faces the upper wall 212 with the handle coupling portion 320 accommodated in the cartridge connector 200. Another embodiment of the present disclosure shown in FIGS. 8A and 8B is different from the embodiment of the present disclosure shown in FIGS. 1 to 7C in that the first cantilever extends from the upper wall of the connector body. Hereinafter, the distinctive feature according to another embodiment of the present disclosure will be mainly described, and redundant description of the components substantially the same as those of the embodiment of the present disclosure will be omitted.

FIGS. 8A and 8B are exemplary views illustrating a razor cartridge 2100 pivoting around a cartridge connector 2200 according to another embodiment of the present disclosure.

Specifically, FIG. 8A is a cross-sectional view of the razor cartridge 2100 which is in a rest position, and FIG. 8B is a cross-sectional view of the razor cartridge 2100 which is pivoted away from the rest position.

In FIGS. 8A and 8B, for convenience of description, illustration of a razor handle is omitted.

Referring to FIGS. 8A and 8B, the first cantilever 2211 may include a base portion 2213, a connecting portion 2215, and a contacting portion 2217.

The base portion 2213 may extend from an upper wall 2212, the connecting portion 2215 may extend from one end of the base portion 2213 in a curved manner, and the contacting portion 2217 may extend from one end of the connecting portion 2215 in a curved manner.

In addition, one end of the contacting portion 2217 may be configured to contact one side of the razor cartridge 2100.

Accordingly, the first cantilever 2211 may have a zigzag shape.

Referring to FIG. 8A, the razor cartridge 2100 may include a plurality of pressing protrusions 2112 protruding from one side of the blade housing 2110.

When the razor cartridge 2100 is in the rest position, the pressing protrusion 2112 may contact the contacting portion 2217 of the first cantilever 2211.

Specifically, the pressing protrusion 2112 may contact the contacting portion 2217 by hanging on the upper side of the contacting portion 2217.

In the rest position, elastic deformation does not occur on the first cantilever 2211, and accordingly the first cantilever 2211 may remain not providing the recovering force to the razor cartridge 2100.

Referring to FIG. 8B, when the razor cartridge 2100 pivots around the cartridge connector 2200, the first cantilever 2211 may be elastically deformed in contact with the pressing protrusion 2112.

Specifically, the razor cartridge 2100 may pivot clockwise in FIG. 8B, and accordingly the pressing protrusion 2112 may also pivot clockwise.

The pressing protrusion 2112 pivoting clockwise may press the contacting portion 2117 downward on the upper side of the contacting portion 2217, and accordingly the first cantilever 2211 may be elastically deformed downward.

As the first cantilever 2211 is elastically deformed downward, elastic force may be applied to the pressing protrusion 2112 upward. The elastic force applied upward may restore the pressing protrusion 2112 or the razor cartridge 2100 counterclockwise. Thus, the razor cartridge 2100 may be restored to the rest position by the first cantilever 2211.

The second cantilever (not shown) may be configured not to contact the razor cartridge 2100 when the razor cartridge 2100 pivots around the cartridge connector 2200.

The razor assembly 2 according to the embodiment of the present disclosure may use elastically deformable cantilevers to provide recovering force to the razor cartridge 2100, which is a technical feature of the embodiment.

Accordingly, the razor assembly 2 according to an embodiment of the present disclosure may provide sufficient recovering force to the razor cartridge 2100 using a simpler structure called a cantilever.

As is apparent from the above, according to the embodiments, a razor assembly may have functions of detachable attachment and appropriate pivot motion of a razor cartridge, while providing an additional function other than body hair cutting.

Although exemplary embodiments have been described for illustrative purposes, those skilled in the art to which the present disclosure belongs will appreciate that various modifications and variations can be made without departing from the essential features of the present disclosure. Therefore, the present disclosure is to be construed as illustrative rather than limiting, and the scope of the present disclosure is not limited by the embodiments. The scope of protection of the disclosure should be construed according to the appended claims, and all technical ideas within the scope of the claims and equivalents thereof should be construed as being within the scope of the disclosure.

What is claimed is:

1. A razor assembly comprising:

a razor cartridge comprising at least one shaving blade having a cutting edge, and a blade housing comprising a front side configured to receive the at least one shaving blade and a rear side opposing the front side, the at least one shaving blade extending in a first direction corresponding to a width direction of the razor cartridge;

a cartridge connector coupled to the razor cartridge such that the razor cartridge is rotatable with respect to the cartridge connector about a rotational axis parallel to the first direction; and a razor handle configured to be coupled to the cartridge connector, wherein the cartridge connector further comprises:

at least two first cantilevers configured to provide a recovering force to the razor cartridge to restore the razor cartridge to a rest position in response to the razor cartridge rotating with respect to the cartridge connector;

at least one second cantilever coupled to at least a part of the razor handle;

a connector body comprising a pair of side walls and at least one cover wall connecting the side walls to form a receiving space surrounded by the side walls and the cover wall; and the at least one cover wall covering the at least one second cantilever, the at least one cover wall comprising an inner surface facing the rear side of the blade housing and an outer surface opposite to the inner surface, and wherein the at least one second cantilever is covered by the inner surface of the at least one cover wall and is invisible when viewed from the outer surface of the at least one cover wall.

2. The razor assembly of claim 1, wherein:

at least one of the at least two first cantilevers and the at least one second cantilever extend forward on the connector body toward the razor cartridge.

3. The razor assembly of claim 1, wherein a width of the cartridge connector in a second direction is greater than a length of the at least one second cantilever, when the second direction refers to a detachment direction between the razor handle and the cartridge connector.

4. The razor assembly of claim 1, wherein the razor handle further comprises:

a handle body;

a handle coupling portion extending from one side of the handle body and configured to be coupled to the cartridge connector; and a function providing portion extending from the handle coupling portion toward the razor cartridge, wherein at least a part of the function providing portion is covered by the inner surface of the at least one cover wall and is invisible when viewed from the outer surface of the at least one cover wall.

5. The razor assembly of claim 4, wherein the function providing portion provides at least a linear motion function to the razor cartridge.

6. The razor assembly of claim 4, wherein:

the at least one second cantilever comprises two second cantilevers; and when the razor handle is coupled to the cartridge connector, the function providing portion is arranged between the two first cantilevers or between the two second cantilevers.

7. The razor assembly of claim 1, wherein the cartridge connector further comprises bosses rotatably coupled to at least a part of the razor cartridge and rotatable about the rotational axis.

8. The razor assembly of claim 7, wherein the bosses define the rotational axis.

9. The razor assembly of claim 1, wherein:

the razor handle comprises a handle coupling portion configured to be coupled to the cartridge connector; and the at least one second cantilever is configured to be detachably coupled to the handle coupling portion.

10. The razor assembly of claim 1, wherein the at least one second cantilever is enclosed in a region formed by the at least one cover wall and the pair of side walls of the connector body, and a portion of the rear side of the blade housing.

11. The razor assembly of claim 1, wherein the at least one cover wall comprises a first wall and a second wall opposing each other, and wherein the at least one second cantilever protrudes from the second wall and extends toward the razor cartridge and away from a grip of the razor handle.

12. The razor assembly of claim 1, wherein the at least one cover wall comprises a first wall and a second wall opposing each other, wherein the at least one second cantilever protrudes from the second wall and comprises a proximal end and a distal end, and wherein the at least one second cantilever becomes closer to the first wall as the at least one second cantilever extends from the proximal end to the distal end.

13. A razor assembly comprising:

a razor cartridge comprising at least one shaving blade having a cutting edge, and a blade housing comprising a front side configured to receive the at least one shaving blade and a rear side opposing the front side, the at least one shaving blade extending in a first direction corresponding to a width direction of the razor cartridge;

a cartridge connector coupled to the razor cartridge such that the razor cartridge is rotatable with respect to the cartridge connector about a rotational axis parallel to the first direction; and a razor handle comprising a handle body, a handle coupling portion extending from one side of the handle body and configured to be coupled to the cartridge connector and a function providing portion extending from the handle coupling portion toward the razor cartridge, wherein the cartridge connector further comprises:

at least one cantilever coupled to at least a part of the razor handle;

a connector body comprising a pair of side walls and at least one cover wall connecting the side walls to form a receiving space surrounded by the side walls and the cover wall; and the at least one cover wall covering the at least one cantilever and at least a part of the function providing portion, the at least one cover wall comprising an inner surface facing the rear side of the blade housing and an outer surface opposite to the inner surface, and wherein the at least one cantilever and the at least a part of the function providing portion are covered by the inner surface of the at least one cover wall and are invisible when viewed from the outer surface of the at least one cover wall.

14. The razor assembly of claim 13, wherein the function providing portion provides at least a linear motion function to the razor cartridge.

15. The razor assembly of claim 13, wherein the function providing portion further comprises:

an eccentric cam body configured to rotate around a central axis; and an eccentric cam head protruding from the eccentric cam body so that the eccentric cam head is away from the central axis, wherein the blade housing further comprises:

a guiding housing;

a blade mounting portion accommodating the at least one shaving blade in the first direction, wherein the blade mounting portion is configured to be movable along a direction parallel to a shaving direction with respect to the guiding housing; and a drive receiving portion connected to the blade mounting portion, and wherein the blade mounting portion is configured to make a reciprocating linear motion with respect to the guiding housing along the direction parallel to the shaving direction as the drive receiving portion delivers an eccentric rotation of the eccentric cam head to the blade mounting portion.

16. The razor assembly of claim 13, wherein:

the at least one cantilever comprises two cantilevers; and when the handle coupling portion is coupled to the cartridge connector, the function providing portion is arranged between the two cantilevers.

17. The razor assembly of claim 13, wherein the cartridge connector further comprises bosses rotatably coupled to at least a part of the razor cartridge and rotatable about the rotational axis.

18. The razor assembly of claim 17, wherein the bosses define the rotational axis.

19. The razor assembly of claim 17, wherein the at least one cantilever is configured to be detachably coupled to the handle coupling portion.

20. A razor assembly comprising:

a razor cartridge comprising at least one shaving blade having a cutting edge, and a blade housing comprising a front side configured to receive the at least one shaving blade and a rear side, the at least one shaving blade extending in a first direction corresponding to a width direction of the razor cartridge;

a cartridge connector coupled to the razor cartridge such that the razor cartridge is rotatable with respect to the cartridge connector about a rotational axis parallel to the first direction; and a razor handle, wherein the cartridge connector further comprises:

a coupling protrusion coupled to at least a part of the razor handle;

a recovering force providing portion configured to provide a recovering force to the razor cartridge to restore the razor cartridge to a rest position in response to the razor cartridge rotating with respect to the cartridge connector; and a connector body comprising a cover wall covering the coupling protrusion and spaced from the coupling protrusion to form a space between the cover wall and the coupling protrusion, the cover wall comprising an inner surface facing the rear side of the blade housing and an outer surface opposite to the inner surface, and wherein the coupling protrusion is covered by the inner surface of the cover wall and is invisible when viewed from the outer surface of the cover wall.

* * * * *